US007475620B2

(12) United States Patent
Chen

(10) Patent No.: US 7,475,620 B2
(45) Date of Patent: Jan. 13, 2009

(54) FLOATABLE HANDLE HAVING AN ENCLOSED CHAMBER

(76) Inventor: Chine-Te Chen, 235 Chung-Ho Box 8-24 Taipei, Taichung Hsien (TW)

( * ) Notice: Subject to any disclaimer, the term of this patent is extended or adjusted under 35 U.S.C. 154(b) by 0 days.

(21) Appl. No.: 11/728,279

(22) Filed: Mar. 26, 2007

(65) Prior Publication Data

US 2007/0169595 A1 Jul. 26, 2007

Related U.S. Application Data

(63) Continuation-in-part of application No. 10/940,674, filed on Sep. 15, 2004, now abandoned.

(51) Int. Cl.
*B23G 1/00* (2006.01)

(52) U.S. Cl. ........................................................ 81/489

(58) Field of Classification Search ................ 81/177.1, 81/436, 438, 489
See application file for complete search history.

(56) References Cited

U.S. PATENT DOCUMENTS 1,376,811 A * 5/1921 Hood .......................... 81/492
2,609,851 A * 9/1952 Hadfield ...................... 81/489
4,336,729 A * 6/1982 Eppenbach .................. 81/439
4,672,745 A * 6/1987 Wilkens ...................... 30/340
5,259,277 A * 11/1993 Zurbuchen ................. 81/177.1
5,701,635 A * 12/1997 Hawkes ....................... 16/421
5,713,252 A * 2/1998 Iwinski et al. ................ 81/439
5,865,077 A * 2/1999 Moffitt et al. ............. 81/427.5
6,202,518 B1 * 3/2001 Moffitt et al. ............. 81/427.5
6,257,093 B1 * 7/2001 Bergacker ...................... 81/20
6,655,240 B1 * 12/2003 DeVecchis et al. ............ 81/438
2004/0020330 A1 * 2/2004 Hu ............................ 81/177.1
2005/0005739 A1 * 1/2005 Langerak ....................... 81/26

* cited by examiner

*Primary Examiner*—David B Thomas

(57) ABSTRACT

A hand tool comprises a handle having an enclosed chamber defined therein, and the handle including a recess defined in the end thereof; and a hole defined in a second end of the handle and being in communication with the chamber, a bolt seals the hole; and the hole being at a lowest end of the handle; and a shank connected to a first end of the handle; and an end of the shank being fixedly inserted in the recess; the recess being an L-shaped recess and the end of the shank being an L-shaped end; and a fluorescent layer being coated on an outer periphery of the handle. Furthermore in another design, the recess being a T-shaped recess and the end of the shank is a T-shaped end.

1 Claim, 6 Drawing Sheets

FLOATABLE HANDLE HAVING AN ENCLOSED CHAMBER

The present invention is a continuation in part of U.S. patent application Ser. No. 10/940,674 filed Sep. 15, 2004 now abandoned which is assigned to and invented by the inventor and applicant of the present invention. Thus, the content of U.S. patent application Ser. No. 10/940,674 is incorporated into the present invention as a part of the present invention.

FIELD OF THE INVENTION

The present invention relates to handles, and particularly to a floatable handle having an enclosed chamber defined therein such that the tool with the handle floats in the water.

BACKGROUND OF THE INVENTION

A conventional hand tool such as a screw driver generally includes a handle and a shank is connected to an end of the handle. The handle is a solid handle which is heavy and cannot float in water. When the hand tools with solid handles are used in work sites where located above waters, such as bridges or ships maintenance, once the hand tools drop into water, they cannot be retrieved. Although some handles do have a recess defined therein for receiving small bits therein, the recess is not well sealed for convenience of accessing the bits received therein. This type of handles cannot float either.

The present invention intends to provide a hand tool that includes a handle with an enclosed chamber such that the handle floats in the water.

SUMMARY OF THE INVENTION

The present invention relates to a hand tool which comprises a handle having an enclosed chamber defined therein, and the handle including a recess defined in the end thereof; and a hole defined in a second end of the handle and being in communication with the chamber, a bolt seals the hole; and the hole is at a lowest end of the handle; and a shank connected to a first end of the handle; and an end of the shank is fixedly inserted in the recess; the recess being an L-shaped recess and the end of the shank is an L-shaped end; and a fluorescent layer is coated on an outer periphery of the handle. Furthermore in another design, the recess being a T-shaped recess and the end of the shank is a T-shaped end.

The handle floats in water because of the chamber so that the hand tool can be easily retrieved if the hand tool drops in the water.

The present invention will become more obvious from the following description when taken in connection with the accompanying drawings which show, for purposes of illustration only, a preferred embodiment in accordance with the. present invention.

DETAILED DESCRIPTION OF THE PREFERRED EMBODIMENT

Figure 1:
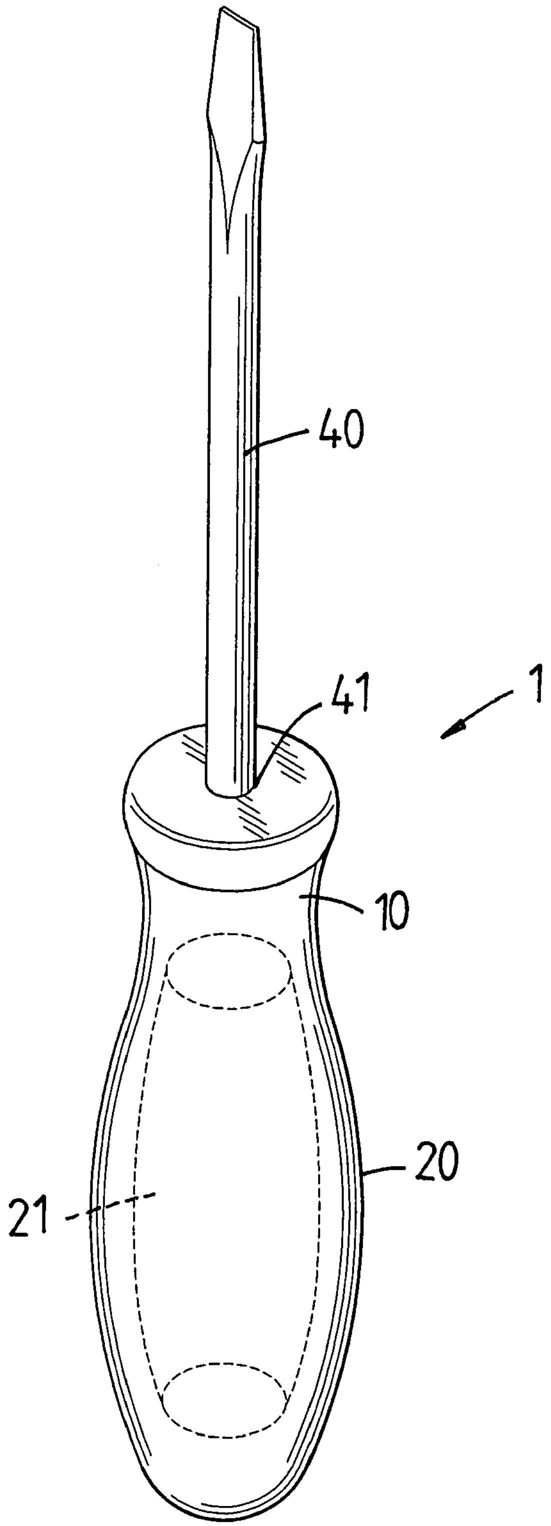
FIG. 1 is a perspective view to show the hand tool with a floatable handle of the present invention.
Figure 2:
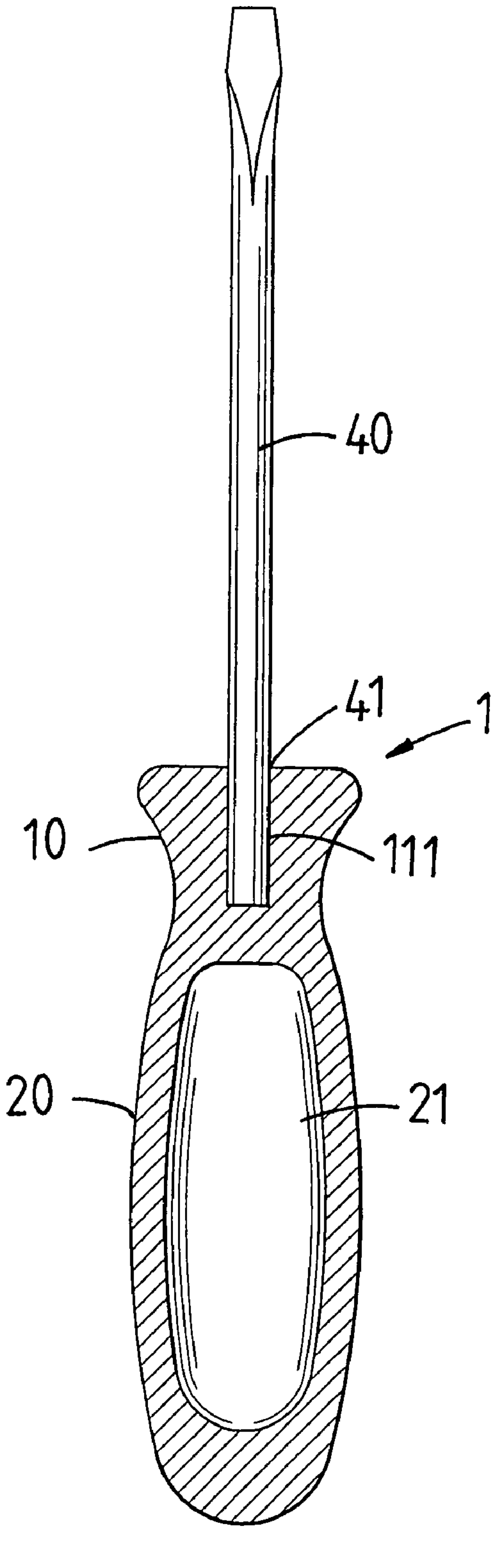
FIG. 2 is a cross sectional view to show the hand tool with a floatable handle of the present invention.

Referring to FIGS. 1 and 2, the hand tool 1 of the present invention comprises a handle 20 having an enclosed chamber 21 defined therein and a recess 111 is defined in a first end of the handle 10. An end 41 of a shank 40 is fixedly inserted in the recess 111. It is noted that the handle 20 is solid except for the chamber 21.

Figure 4:
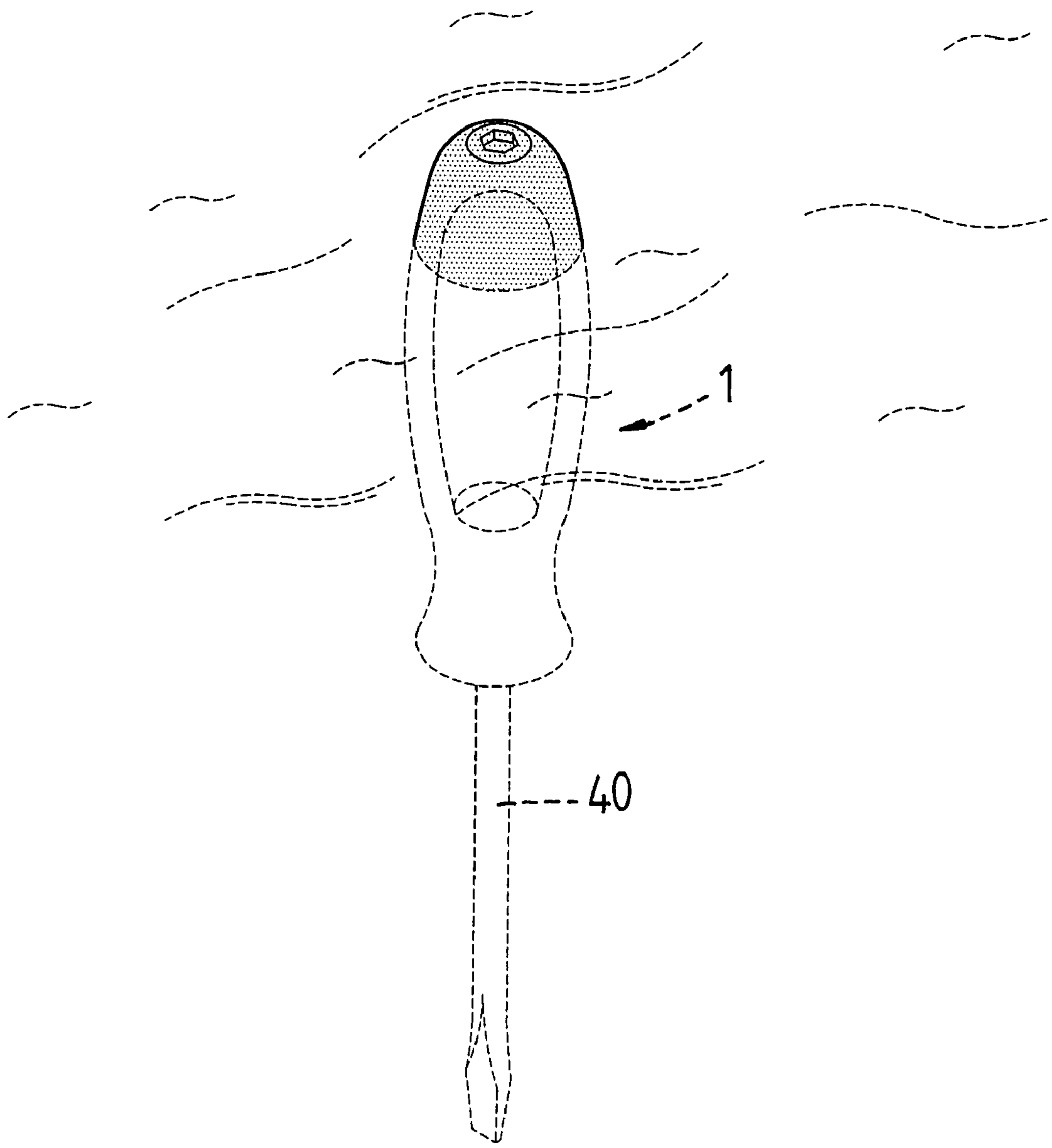
FIG. 4 shows that the handle floats in the water.

As shown in FIG. 4, when the hand tool 1 drops into water, because of the chamber 21 in the handle 20, the handle 20 floats.

Figure 3:
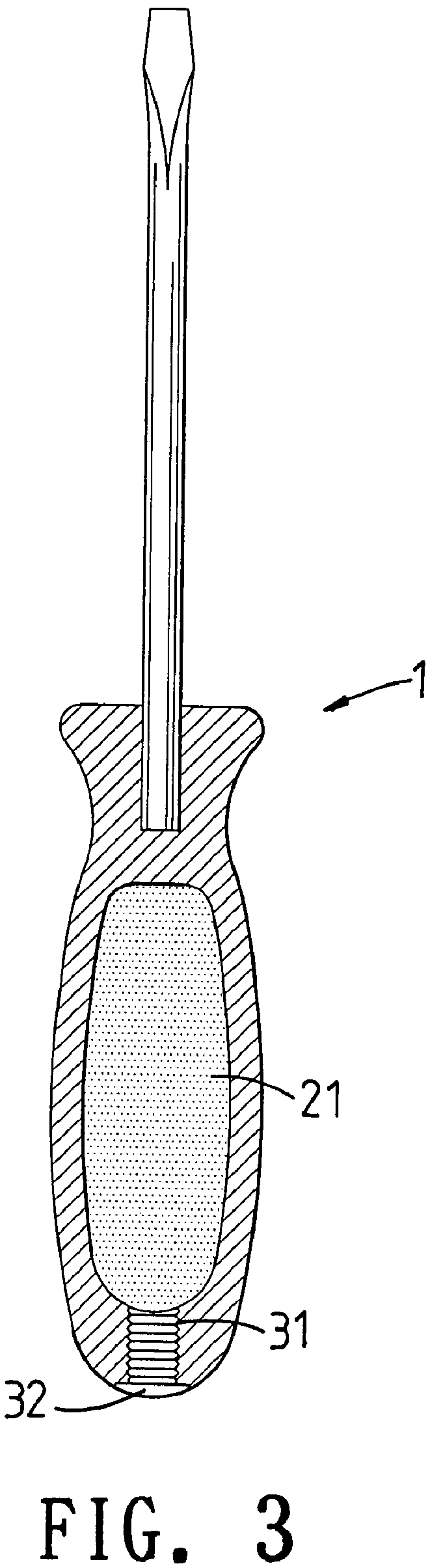
FIG. 3 shows another embodiment of the hand tool with a floatable handle of the present invention.
Figure 5:
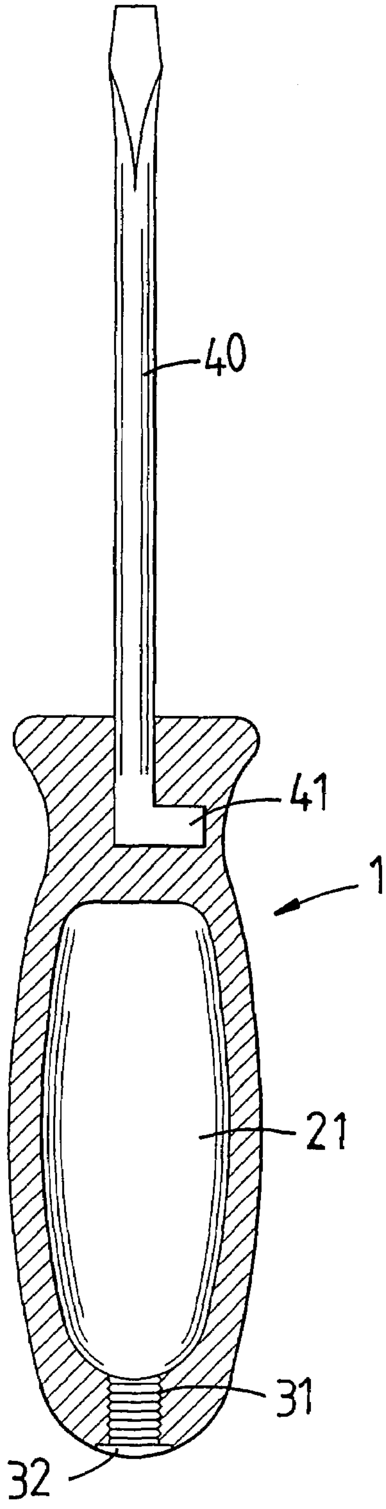
FIG. 5 is a cross sectional view to show yet another embodiment of the hand tool with a floatable handle of the present invention.

As shown in FIG. 3, the recess is an L-shaped recess and the end 41 of the shank 40 is an L-shaped end such that the shank 40 is firmly combined with the handle 20. FIG. 5 shows that a hole 31 is defined in a second end of the handle 10 and in communication with the chamber 21, and a bolt 32 seals the hole 31. By unscrewing the bolt 32, the chamber 21 can be filled with sands to increase its weight and performs like the conventional hand tools if the hand tool 1 is not used above the water.

Figure 6:
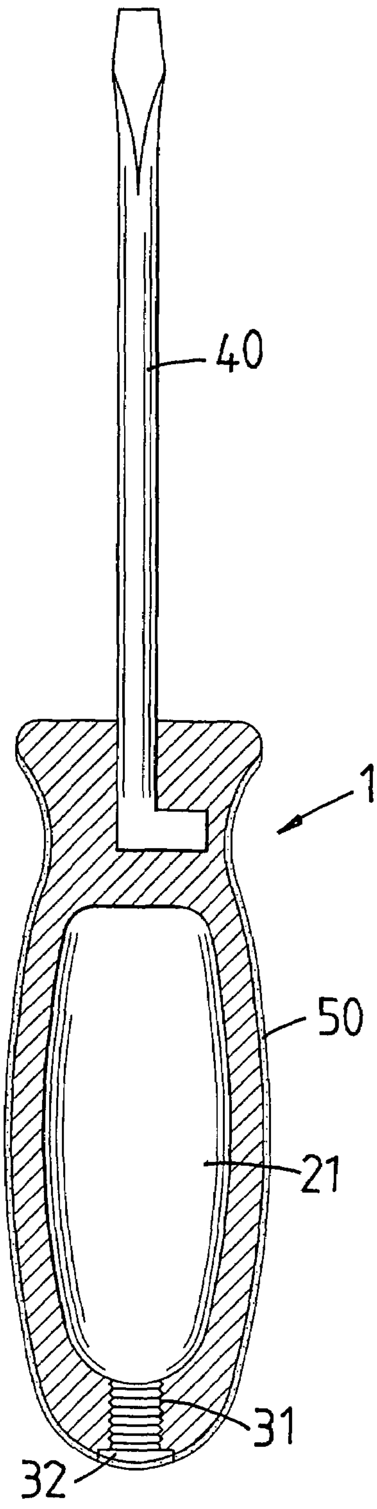
FIG. 6 shows that a fluorescent layer is coated on an outer periphery of the handle.

FIG. 6 shows that a fluorescent layer 50 is coated on an outer periphery of the handle 10 of FIG. 5 so that the handle 20 can be seen in a dark area.

Figure 7:
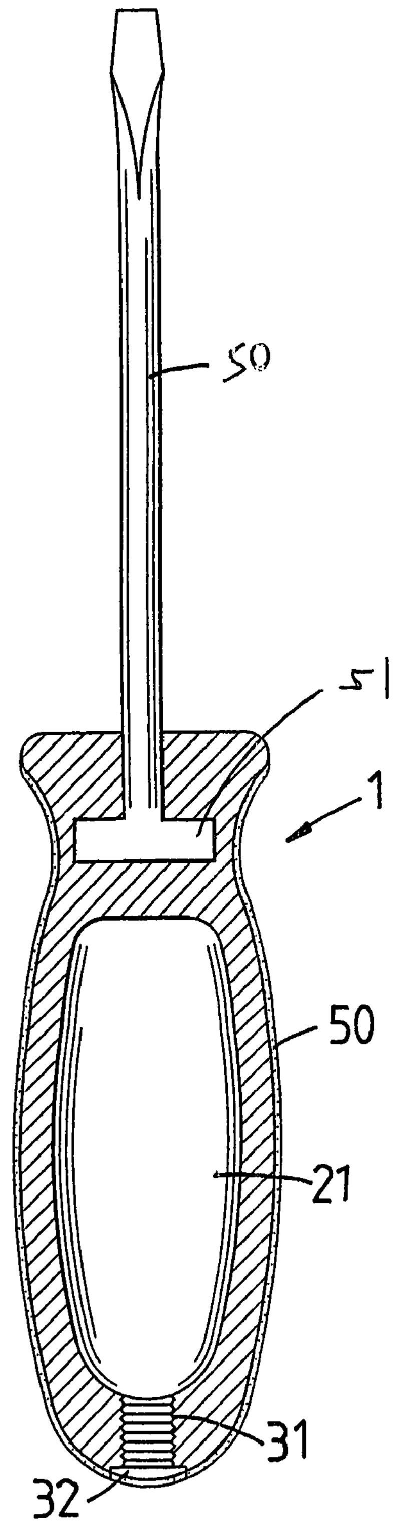
FIG. 7 shows the another embodiment of the present invention, where shank has a T shape.

FIG. 7 shows that the recess is a T shape recess and the end 71 of the shank 70 has a T shape end such that the shank 70 is firmly combined with the handle 20. FIG. 7 shows that a hole 31 is defined in a second end of the handle 10 and in communication with the chamber 21, and a bolt 32 seals the hole 31. By unscrewing the bolt 32, the chamber 21 can be filled with sands to increase its weight and performs like the conventional hand tools if the hand tool 1 is not used above the water. Moreover, in this embodiment, a fluorescent layer 50 is coated on an outer periphery of the handle 10 of FIG. 5 so that the handle 20 can be seen in a dark area.

In above embodiments of the present invention, the hand tool 1 is a screwdriver and the handle 20 has a neck at the portion near the shank and the handle has a convex cambered shape. The hole 31 is at a lowest end of the handle 20.

While we have shown and described the embodiment in accordance with the present invention, it should be clear to those skilled in the art that further embodiments may be made without departing from the scope of the present invention.

What is claimed is:

1. A hand tool comprising:

a handle having an enclosed chamber defined therein, and the handle including a recess defined in the end thereof; and a hole defined in a second end of the handle and being in communication with the chamber, a bolt seals the hole; and the hole being at a lowest end of the handle; and a shank connected to a first end of the handle; and an end of the shank being fixedly inserted in the recess; the recess being an L-shaped recess and the end of the shank being an L-shaped end; and a fluorescent layer being coated on an outer periphery of the handle.

* * * * *